United States Patent
Cross et al.

(10) Patent No.: US 11,914,472 B2
(45) Date of Patent: Feb. 27, 2024

(54) USE OF CXL EXPANSION MEMORY FOR METADATA OFFLOAD

(71) Applicant: DELL PRODUCTS L.P., Round Rock, TX (US)

(72) Inventors: Kevin Matthew Cross, Pflugerville, TX (US); Jordan Chin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/863,616

(22) Filed: Jul. 13, 2022

(65) Prior Publication Data

US 2024/0020195 A1    Jan. 18, 2024

(51) Int. Cl.
| | |
|---|---|
| *G11C 29/00* | (2006.01) |
| *G06F 11/10* | (2006.01) |
| *G06F 21/79* | (2013.01) |
| *G06F 21/60* | (2013.01) |
| *G06F 11/07* | (2006.01) |

(52) U.S. Cl.
CPC ...... *G06F 11/1068* (2013.01); *G06F 11/0772* (2013.01); *G06F 21/602* (2013.01); *G06F 21/79* (2013.01)

(58) Field of Classification Search
CPC .. G06F 11/1068; G06F 11/0772; F06F 21/79; F06F 21/602
See application file for complete search history.

(56) References Cited

U.S. PATENT DOCUMENTS

| | | |
|---|---|---|
| 9,772,938 B2 | 9/2017 | Talagala et al. |
| 9,836,229 B2 | 12/2017 | D'Sa et al. |
| 11,687,273 B2 * | 6/2023 | Confalonieri ......... G06F 3/0619 711/154 |
| 2012/0297256 A1 * | 11/2012 | Plondke ............. G06F 12/0893 711/E12.001 |
| 2021/0240655 A1 * | 8/2021 | Das Sharma ....... G06F 13/1668 |
| 2023/0009642 A1 * | 1/2023 | Eilert .................... G06F 3/0679 |
| 2023/0281113 A1 * | 9/2023 | Kumar ................. G06F 12/023 711/147 |

\* cited by examiner

*Primary Examiner* — Samir W Rizk
(74) *Attorney, Agent, or Firm* — Larson Newman, LLP

(57) ABSTRACT

An information handling system includes a memory module, a memory controller coupled to the memory controller by a memory bus, and an expansion memory device coupled to the memory controller by a data communication interface. The memory controller receives user data, calculates error correction code (ECC) data for the user data, determines metadata related to the user data, writes the user data and the ECC data to the memory module via the memory bus, and stores the metadata to the expansion memory device with a transaction on the data communication interface.

20 Claims, 5 Drawing Sheets

USE OF CXL EXPANSION MEMORY FOR METADATA OFFLOAD

FIELD OF THE DISCLOSURE

This disclosure generally relates to information handling systems, and more particularly relates to the use of compute express link (CXL) expansion memory for metadata offloads in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory controller that receives user data, calculates error correction code (ECC) data for the user data, determines metadata related to the user data, writes the user data and the ECC data to a memory module, and stores the metadata to an expansion memory device with a transaction on a data communication interface.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
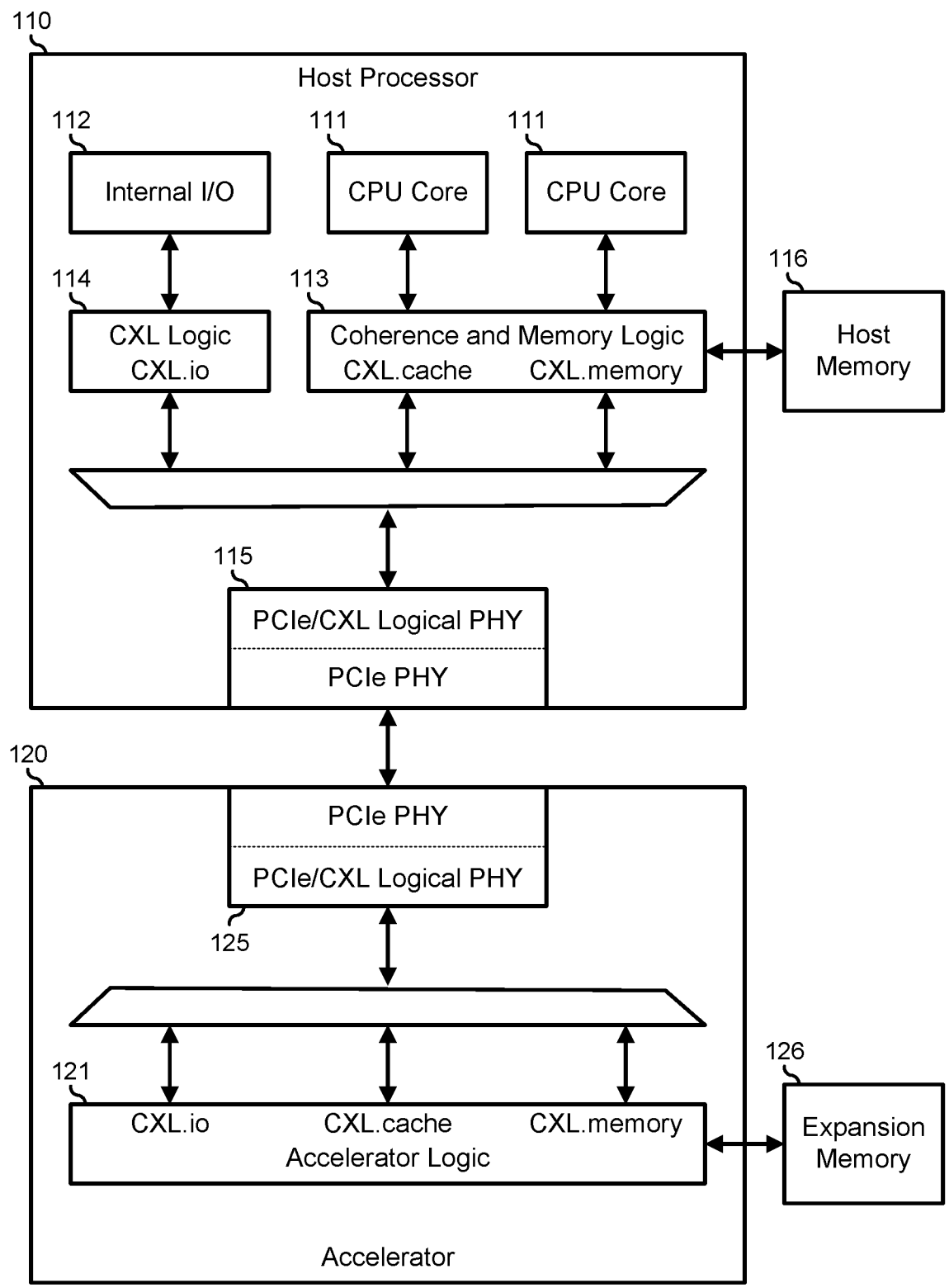
FIG. 1 is a block diagram of a compute express link (CXL) information handling system according to an embodiment of the current disclosure.

FIG. 1 shows an information handling system 100, including a host processor 110 with associated host memory 116, and an accelerator device 120 with associated expansion memory 126. Host processor 110 includes one or more processor core 111, various internal input/output (I/O) devices 112, coherence and memory logic 113, Compute Express Link (CXL) logic 114, and a PCIe physical layer (PHY) interface 115. Coherence and memory logic 113 provides cache coherent access to host memory 116. The operation of a host processor, and particularly of the component functional blocks within a host processor, are known in the art, and will not be further described herein, except as needed to illustrate the current embodiments.

Accelerator device 120 includes accelerator logic 121, and a PCIe PHY interface 125 that is connected to PCIe PHY interface 115. Accelerator logic 121 provides access to expansion memory 126. Accelerator device 120 represents a hardware device configured to enhance the overall performance of information handling system 100. An examples of accelerator device 120 may include a smart Network Interface Card (NIC) or Host Bus Adapter (HBA), a Graphics Processing Unit (GPU), Field Programmable Gate Array (FPGA), or Application Specific Integrated Circuit (ASIC) device, a memory management and expansion device or the like, or another type of device configured to improve the performance of information handling system 100, as needed or desired. In particular, being coupled to host processor 110 via the PCIe link established between PCIe interfaces 115 and 125, accelerator device 120 may represent a task-based device that receives setup instructions from the host processor, and then independently executes the tasks specified by the setup instructions. In such cases, accelerator device 120 may access host memory 116 via a Direct Memory Access (DMA) device or DMA function instantiated on the host processor. When representing a memory management device, accelerator device 120 may represent a device configured to provide an expanded memory capacity, in the form of expansion memory 126, thereby increasing the overall storage capacity of information handling system 100, or may represent a memory capacity configured to increase the memory bandwidth of the information handling system, as needed or desired.

Information handling system 100 represents an information handling system configured in conformance with a compute express link (CXL) standard, such as a CXL 1.1 specification, a CXL 2.0 specification, or any other CXL standard as may be published from time to time by the CXL Consortium. The CXL standard is an industry-supported interconnection standard that provides a cache-coherent interconnection between processors, accelerator devices, memory expansion devices, or other devices, as needed or desired. In this way, operations performed at diverse locations and by diverse architectures may maintain a memory coherency domain across the entire platform. The CXL standard provides for three (3) related protocols: CXL.io, CXL.cache, and CXL.memory. The CXL.io protocol represents an I/O protocol that is based upon the PCIe 5.0 protocol (for CXL specification 1.1) or the PCIe 6.0 protocol (for CXL specification 2.0).

For example, the CXL.io protocol provides for device discovery, configuration, and initialization, interrupt and DMA handling, and I/O virtualization functions, as needed or desired. The CXL.cache protocol provides for processors to maintain a cache-coherency domain with accelerator devices and their attached expansion memory, and with capacity- and bandwidth-based memory expansion devices, as needed or desired. The CXL.memory protocol permits processors and the like to access memory expansion devices in a cache-coherency domain utilizing load/store-based commands, as needed or desired. Further, the CXL.memory protocol permits the use of a wider array of memory types than may be supported by processor 110. For example, a processor may not provide native support for various types of non-volatile memory devices, such as Intel Optane Persistent Memory, but the targeted installation of an accelerator device that supports Intel Optane Persistent Memory may permit the information handling system to utilize such memory devices, as needed or desired.

In this regard, host processor 110 and accelerator device 120 each include logic and firmware configured to instantiate the CXL.io, CXL.cache, and CXL.memory protocols. In particular, within host processor 110, coherence and memory logic 113 instantiates the functions and features of the CXL.cache and CXL.memory protocols, and CXL logic 114 implements the functions and features of the CXL.io protocol. Further, PCIe PHY 115 instantiates a virtual CXL logical PHY. Likewise, within accelerator device 120, accelerator logic 121 instantiates the CXL.io, CXL.cache, and CXL.memory protocols, and PCIe PHY 125 instantiates a virtual CXL logical PHY. Within a CXL enabled accelerator device such as accelerator device 120, both the CXL.cache and CXL.memory protocols do not have to be instantiated, as needed or desired, but any CXL enabled accelerator device must instantiate the CXL.io protocol.

Figure 2A:
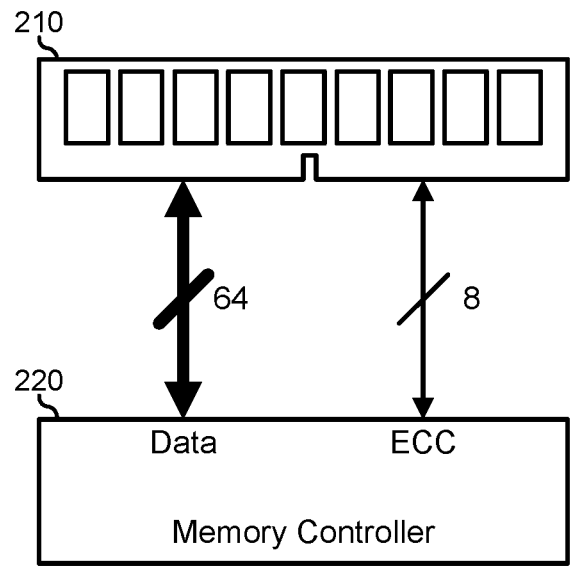
FIGS. 2A and 2B are block diagrams of information handling systems according to the prior art.

FIG. 2A illustrates an information handling system 200 according to the prior art. Information handling system 200 includes a memory module 210, and a memory controller 220. Information handling system 200 may be understood to be similar to information handling systems 100, described above, or information handling system 500, described below, and will be understood to include additional components as needed or desired. Memory module 210 represents a memory storage device, such as a Double Data Rate (DDR) Dual In-Line Memory Module (DIMM), a Small Outline DIMM (SO-DIMM), a Compression Attached Memory Module (CAMM), or the like, and may represent one or more additional memory modules, as needed or desired.

Memory controller 220 is connected to memory module 210 by a data bus that includes 64-bits of user data and 8-bits of Error Correcting Code (ECC) data. The ECC data provides an error checking and correcting function. Memory controller 220 operates to receive the 64-bit user data and to generate the 8-bit ECC data. The 64-bit user data and the 8-bit ECC data are then written to memory module 210. Upon reading the data, memory module 210 sends the 64-bit user data and the 8-bit ECC data to memory controller 220. Memory controller 220 then generates new 8-bit ECC data based upon the received 64-bit user data, and compares the new ECC data with the received ECC data. If the new ECC data matches the received ECC data, the user data is validated as being error free. On the other hand, if the new ECC data differs from the received ECC data, the user data is understood to include bit errors. A typical ECC scheme utilizing 64-bit user data and 8-bit ECC data will enable the correction of single-bit errors, and the detection of double-bit errors. If memory controller 220 detects a single-bit error in the user data, the memory controller corrects the data and processing proceeds as intended. On the other hand, if memory controller 220 detects a double-bit error in the user data, the memory controller issues an indication of a fault and information handling system 200 invokes an exception handler to deal with the fault. The details of error detection and correction, ECC generation, fault handling, and the like are known in the art and will not be further described herein, except as needed to illustrate the current embodiments.

Figure 2B:
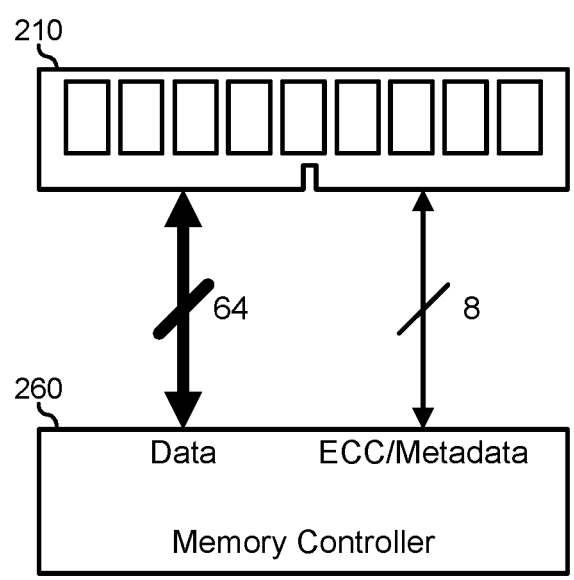

FIG. 2B illustrates an information handling system 250 according to the prior art. Information handling system 250 includes a memory module 210, as described above, and a memory controller 260. Information handling system 250 may be understood to be similar to information handling systems 200. Memory controller 260 is connected to memory module 210 by a data bus that includes 64-bits of user data and 8-bits of ECC data or controller generated metadata. Various processor manufacturers are including functions and features within the memory controllers of their processors that generate, manage, and manipulate certain proprietary metadata associated with the stored user data. An example of manufacturer specific metadata may include a flag of a number of uncorrectable errors that have been written to memory module 210, a directory status associated with the user data, a memory encryption hash, a security key hash, a caching tag, or the like.

The metadata may consist of one or more bits of information that is stored on memory module 210 in the 8-bit data field associated with the ECC data. In other words, the inclusion of one or more metadata bits necessarily decreases the number of ECC data bits stored in association with the user data. As such, the inclusion of metadata results in a decrease in the robustness of the ECC function as described above. For example, by utilizing less than 8-bits of the ECC data for the actual error detection and correction function, memory controller 260 may only be able to correct single-bit errors but not to detect double-bit errors, the memory controller may only be able to detect single- or double-bit errors, but be unable to correct any errors, or the memory controller may be otherwise degraded in its ability to correct or detect bit errors in the received user data. Memory controller 260 may include setting options that enable the use of all 8-bits for error detection and correction purposes. However, the use of such setting options then compromises the ability to attain the benefits of the use of the metadata, leaving the end user of information handling system 250 to choose between full-scope error detection and correction without the benefits of the metadata, or a compromised error detection and correction functionality with the benefits of the metadata. Note that, as illustrated, information handling systems 200 and 250 represent typical early generation DDR topologies (i.e., first generation DDR (DDR1) through fourth generation DDR (DDR4)). Such illustration may be understood to be exemplary, and that, in newer generation DDR topologies (i.e., fifth generation DDR (DDR5) and beyond), the user data, the ECC data, and the metadata may be arranged differently. However, the teachings of the current disclosure, as described below, may be applied to any topology or generation of DDR, as needed or desired.

Figure 3:
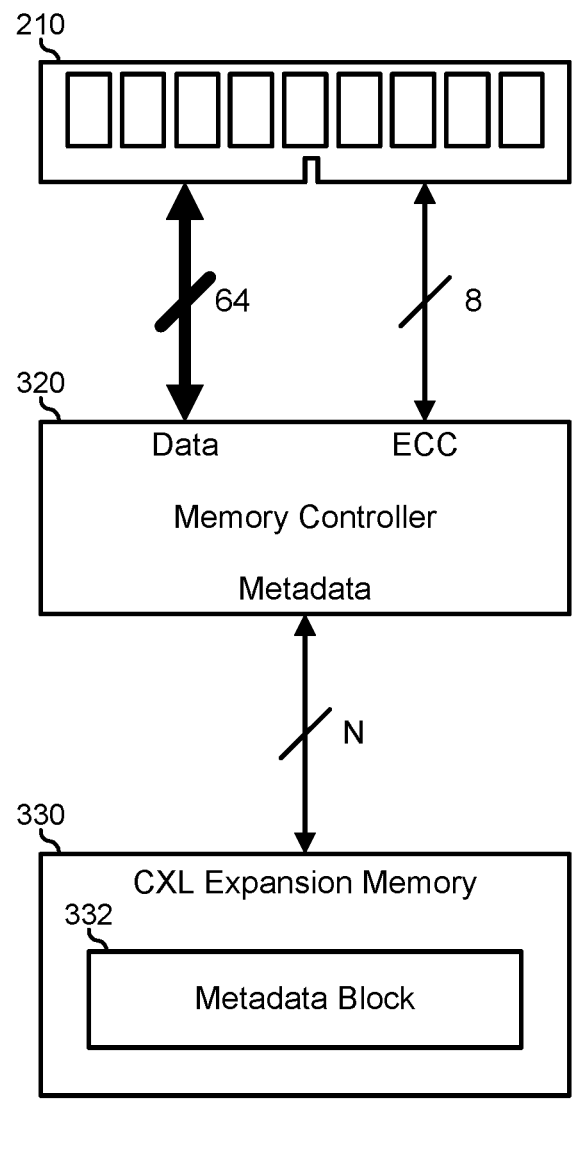
FIG. 3 is a block diagram of a CXL information handling system according to an embodiment of the current disclosure.

FIG. 3 illustrates an information handling system 300, including a memory module 210, a memory controller 320, and a CXL expansion memory 330. Information handling system 300 may be understood to be similar to information handling systems 100, described above, or information handling system 500, described below, and will be understood to include additional components as needed or desired. Memory controller 320 is connected to memory module 210 by a data bus that includes 64-bits of user data and 8-bits of Error Correcting Code (ECC) data. The ECC data provides an error checking and correcting function as described above with regard to FIG. 2A. Memory controller 320 utilizes the CXL protocol to access CXL expansion memory 330, for example through a PCIe/CXL interface. As such, CXL expansion memory 330 may represent a memory device associated with a CXL memory riser card, another type of CXL accelerator device, a network storage device, such as a NAS or SAN that is accessed via a CXL NIC or HBA, or another type of CXL memory expansion device, as needed or desired. Memory module 210 is utilized in each of information handling systems 200, 250, and 300, indicating that the use of a specific types of memory module for the various embodiments described herein is not necessary, but a common type of memory module that is suitable in one information handling system may likewise be suitable for all of the information handling systems, and that the memory module may be unaware of the types of data being stored in the "ECC" field.

In a particular embodiment, memory controller 320 supports the various manufacturer functions and features that generate, manage, and manipulate the proprietary metadata associated with the stored user data. The metadata may consist of one or more bits of information that is stored in a metadata block 332 of CXL expansion memory 330. Metadata block 332 may represent one or more CXL expansion memory device, or a portion of a particular CXL expansion memory device that is mapped and reserved for the storage of the metadata associated with memory module 210, as needed or desired. More generally, metadata block 332 may represent a region of CXL expansion memory 330 that is configured to store the metadata associated with one or more memory module similar to memory module 210.

For example, metadata block 332 may be configured with a storage capacity sufficient to store metadata for all of the system main memory of information handling system 300, may be configured as several separate storage capacities, each sufficient to store metadata for the portion of system main memory associated with a particular processor or processor core, or may be otherwise configured to store the metadata associated with the system main memory as needed or desired. In this embodiment, the metadata stored in metadata block 332 may be equivalent to the metadata stored by memory controller 220 on memory module 210, as described above with regard to FIG. 2B, or may include additional metadata bits for supporting a richer set of functions and features. In either case, the robustness of the ECC functionality, as shown with regard to FIG. 2A may be maintained, without sacrificing the added functionality provided by the inclusion of the associated metadata.

When memory controller 320 prepares a write transaction, the memory controller receives the 64-bit user data and generate the 8-bit ECC data and the metadata based upon the received user data. The 64-bit user data and the 8-bit ECC data are then written to memory module 210, and the metadata is written to metadata block 332. The writing of the user data and the ECC data will occur as a memory transaction over the memory bus, while the writing of the metadata will occur as a CXL transaction on a PCIe/CXL interface. Similarly, when the user data is to be read, memory controller 320 executes a read transaction on the memory bus to retrieve the user data and the CXL data from memory module 210, and issues a CXL transaction to CXL expansion memory 330 to retrieve the metadata from metadata block 332. In a particular embodiment, the interleaving of the data storage between memory module 210 and metadata block 332 does not negatively impact the current embodiments. Memory controller 320 may operate to implement the writing of the metadata to metadata block 332 in conjunction with an instantiation of the CXL.memory protocol, with the CXL.io protocol, with the CXL.cache protocol, with vendor specific configuration of the memory controller, or a combination thereof.

In a particular embodiment, because the number of metadata bits is small as compared with the typical number of data bits in a PCIe/CXL transaction, memory controller 320 operates to aggregate the metadata writes to metadata block 332 until a predetermined number of metadata bits are stored, and then performs a single PCIe/CXL transaction to store the aggregated metadata to the metadata block. Moreover, it will be understood that, as compared with the metadata as described with regard to FIG. 2B, where the number of metadata bits is limited to eight (8) (i.e., the number of ECC bits), the current embodiments permit the scaling of the number or metadata bits independently from the size, density, or capabilities exhibited by memory module 210. Thus the development of metadata functions and features may proceed independently from the development of memory module technologies, and the memory interface can remain untouched by changes in the metadata architecture. In a particular case, a manufacturer of memory controller 320 (typically the processor manufacturer) can provide a particular set of metadata functions and features at an initial sale of the device, while permitting an update path for expanded metadata functions and features as an upgrade path. Moreover, the implementation of the metadata functions and features can be redistributed within a datacenter between servers as semi-atomic hardware elements with proper firmware enablement.

In a particular embodiment, a Basic Input/Output System (BIOS)/Universal Extensible Firmware Interface (UEFI) operates during a system boot process for information handling system 300 to initialize CXL expansion memory 330, and to allocated metadata block 332 to the use as described above. The BIOS/UEFI may determine the storage capacity of the system main memory, including the capacity of memory module 210, and allocates metadata block 332 with a storage capacity large enough to store the metadata for the determined storage capacity of the system main memory. The BIOS/UEFI operates to determine that CXL expansion memory 330 is compatible with the use as a storage device for metadata. This determination may include ensuring that CXL expansion memory 320 had the needed bandwidth and speed, whether interleaving with memory module 210 is available, and the like. Typically, the storage of metadata on CXL expansion memory 330 may utilize a heterogeneous interleave with the memory module 210.

Figure 4:
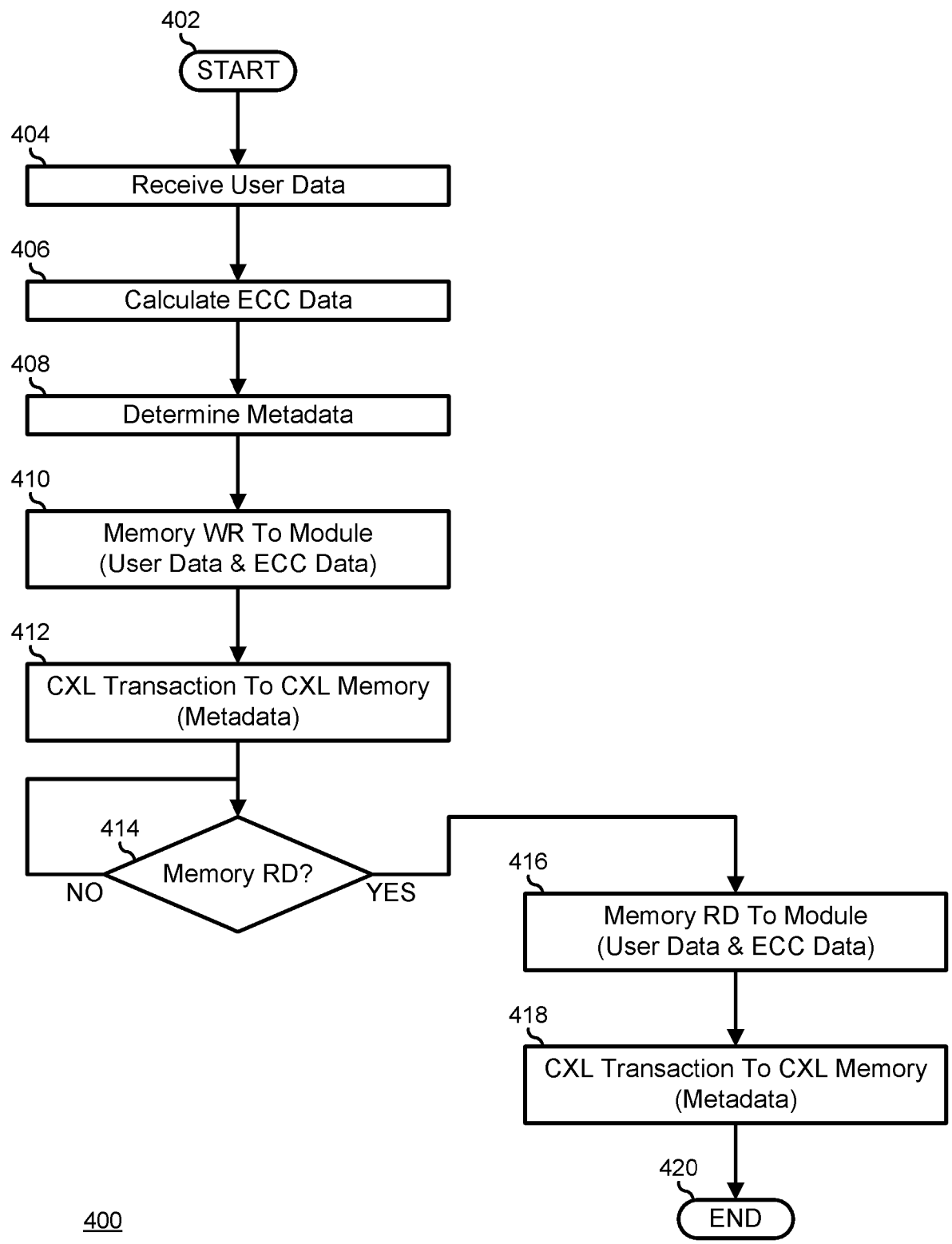
FIG. 4 is a flowchart illustrating a method for the use of CXL expansion memory for metadata offloads in an information handling system according to an embodiment of the current disclosure.

FIG. 4 illustrates a method 400 for the use of CXL expansion memory for metadata offloads in an information handling system, starting at block 402. A memory controller receives user data to be written to a system memory module of the information handling system in block 404. The memory controller calculates ECC data for the user data in block 406, and determines the metadata for the user data in block 408. The memory controller issues a memory write (WR) to the memory module in block 410. The memory write (WR) includes the user data and the ECC data. The memory module issues a CXL memory transaction to a CXL expansion memory in block 412. The CXL memory transaction includes the metadata. Here, it will be understood that blocks 410 and 412 may typically be performed as parallel operations, as needed or desired. A decision is made as to whether or not a memory read (RD) for the user data has been received by the memory controller in decision block 414. If not, the "NO" branch of decision block 414 is taken and the method loops back to the decision block until a memory read (RD) for the user data is received by the memory controller. When the memory read (RD) for the user data is received by the memory controller, the "YES" branch of decision block 414 is taken and the memory controller issues a memory read (RD) to the memory module in block 416. In response, the memory module provides the user data and the ECC data to the memory controller. The memory module issues a CXL memory transaction to a CXL expansion memory in block 418. Here, it will be understood that blocks 416 and 418 may typically be performed as parallel operations, as needed or desired. In response, the CXL expansion memory provides the metadata to the memory controller. The method ends at block 420.

Figure 5:
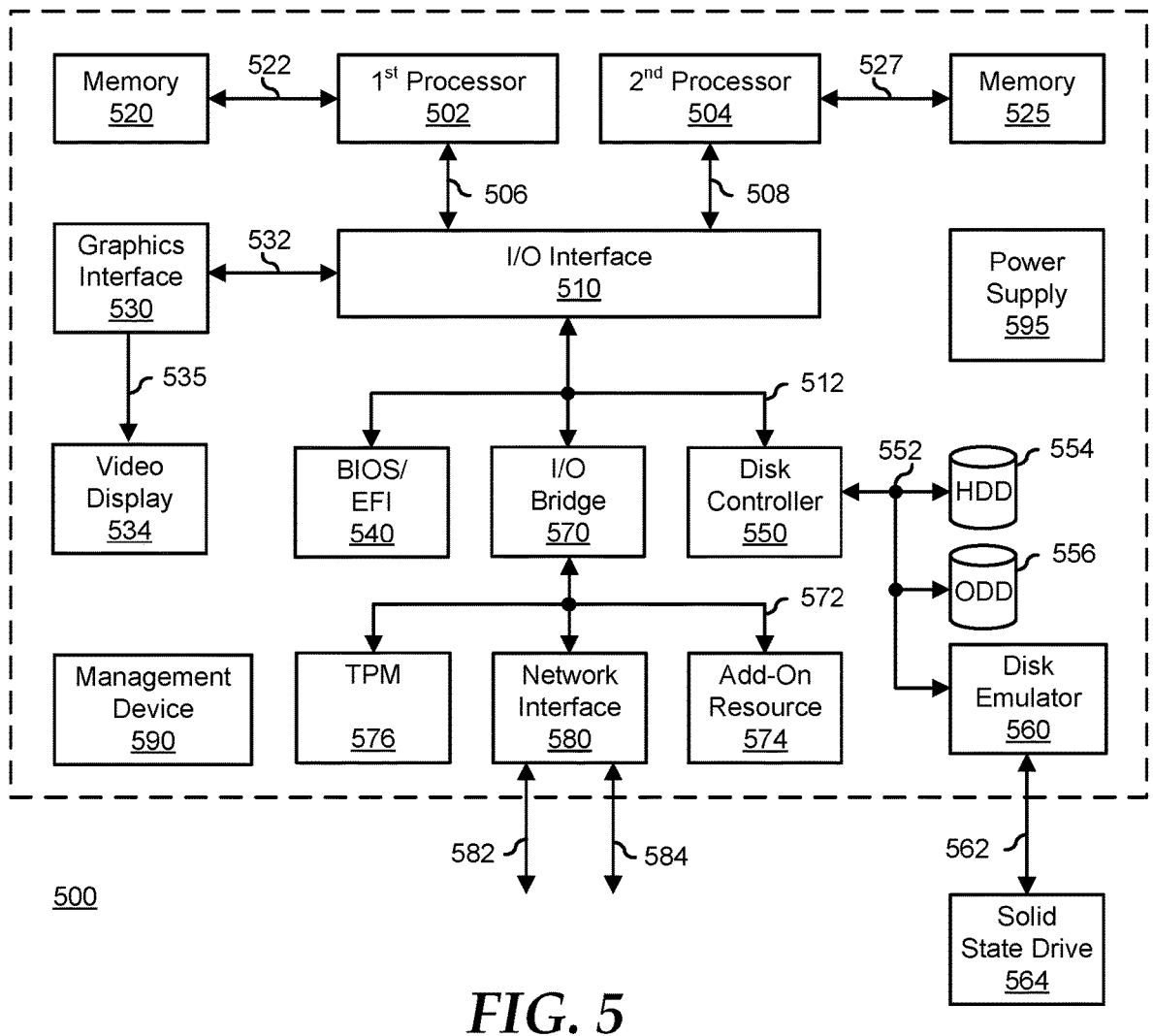
FIG. 5 is a block diagram illustrating a generalized information handling system according to another embodiment of the present disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520 and 525, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 535 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a memory module;
a memory controller coupled to the memory module by a memory bus; and
an expansion memory device coupled to the memory controller by a data communication interface;
wherein the memory controller is configured to receive user data, to calculate error correction code (ECC) data for the user data, to determine metadata related to the user data, to write the user data and the ECC data to the memory module via the memory bus, and to store the metadata to the expansion memory device with a transaction on the data communication interface.

2. The information handling system of claim 1, wherein the expansion memory device is a Compute Express Link (CXL) memory expansion device.

3. The information handling system of claim 2, wherein the memory controller stores the metadata to the expansion memory device utilizing a CXL protocol.

4. The information handling system of claim 3, wherein the CXL protocol includes at least one of a CXL.io protocol, a CXL.memory protocol, and a CXL.cache protocol.

5. The information handling system of claim 1, wherein the metadata includes at least one of a flag of a number of uncorrectable errors that have been written to the memory module, a directory status associated with the user data, a memory encryption hash, a security key hash, and a caching tag.

6. The information handling system of claim 1, wherein the memory controller is further configured to receive a memory read transaction to read the user data, and, in response to the memory read transaction, to read the user data and the ECC data from the memory module, and to retrieve the metadata from the expansion memory.

7. The information handling system of claim 1, wherein the expansion memory includes a metadata block reserved to receive metadata from the memory controller.

8. The information handling system of claim 7, wherein the metadata block is set up by a basic input/output system (BIOS) of the information handling system.

9. The information handling system of claim 1, wherein the memory module is a double data rate dual in-line memory module.

10. The information handling system of claim 9, wherein the user data includes 64-bits of data and the ECC data includes 8-bits of data.

11. A method comprising:
coupling a memory module of an information handling system to a memory controller of the information handling system via a memory bus;
coupling the memory controller to an expansion memory device of the information handling system by a data communication interface;
receiving, by the memory controller, user data;
determining error correction code (ECC) data for the user data;
determining metadata related to the user data;
writing the user data and the ECC data to the memory module via the memory bus; and
storing the metadata to the expansion memory device with a transaction on the data communication interface.

12. The method of claim 11, wherein the expansion memory device is a compute express link (CXL) memory expansion device.

13. The method of claim 12, further comprising storing, by the memory controller, the metadata to the expansion memory device utilizing a CXL protocol.

14. The method of claim 13, wherein the CXL protocol includes at least one of a CXL.io protocol, a CXL.memory protocol, and a CXL.cache protocol.

15. The method of claim 11, wherein the metadata includes at least one of a flag of a number of uncorrectable errors that have been written to the memory module, a directory status associated with the user data, a memory encryption hash, a security key hash, and a caching tag.

16. The method of claim 11, further comprising:
receiving, by the memory controller, a memory read transaction to read the user data;
in response to the memory read transaction, reading the user data and the ECC data from the memory module; and
in further response to the memory read transaction, retrieving the metadata from the expansion memory.

17. The method of claim 11, wherein the expansion memory includes a metadata block reserved to receive metadata from the memory controller.

18. The method of claim 17, further comprising setting up the metadata block by a basic input/output system of the information handling system.

19. The method of claim 11, wherein the memory module is a double data rate dual in-line memory module, and wherein the user data includes 64-bits of data and the ECC data includes 8-bits of data.

20. An information handling system, comprising:
a memory controller coupled to a memory module by a memory bus; and
a compute express link memory riser card coupled to the memory controller by a data communication interface;
wherein the memory controller is configured to receive user data, to calculate error correction code data for the user data, to determine metadata related to the user data, to write the user data and the error correction code data to the memory module via the memory bus, and to store the metadata to the compute express link memory riser card with a transaction on the data communication interface.

* * * * *